United States Patent
Kawada et al.

(10) Patent No.: US 12,283,692 B2
(45) Date of Patent: Apr. 22, 2025

(54) POSITIVE ELECTRODE ACTIVE MATERIAL FOR NONAQUEOUS ELECTROLYTE SECONDARY BATTERIES, AND NONAQUEOUS ELECTROLYTE SECONDARY BATTERY

(71) Applicant: Panasonic Intellectual Property Management Co., Ltd., Osaka (JP)

(72) Inventors: Hiroshi Kawada, Hyogo (JP); Akiko Murata, Osaka (JP); Mitsuhiro Hibino, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 484 days.

(21) Appl. No.: 17/763,987

(22) PCT Filed: Sep. 29, 2020

(86) PCT No.: PCT/JP2020/036800
§ 371 (c)(1),
(2) Date: Mar. 25, 2022

(87) PCT Pub. No.: WO2021/065860
PCT Pub. Date: Apr. 8, 2021

(65) Prior Publication Data
US 2022/0393164 A1   Dec. 8, 2022

(30) Foreign Application Priority Data
Sep. 30, 2019   (JP) .................. 2019-179786

(51) Int. Cl.
H01M 4/525   (2010.01)
C01G 53/00   (2006.01)
C01G 53/54   (2025.01)
H01M 4/02   (2006.01)
H01M 4/505   (2010.01)
H01M 10/0525   (2010.01)

(52) U.S. Cl.
CPC .......... H01M 4/525 (2013.01); C01G 53/54 (2013.01); H01M 4/505 (2013.01); H01M 10/0525 (2013.01); H01M 2004/028 (2013.01)

(58) Field of Classification Search
None
See application file for complete search history.

(56) References Cited

U.S. PATENT DOCUMENTS

| | | |
|---|---|---|
| 2008/0193841 A1 | 8/2008 | Sun et al. |
| 2013/0183589 A1 | 7/2013 | Minamida et al. |
| 2017/0040594 A1 | 2/2017 | Yamaki et al. |
| 2018/0212233 A1 | 7/2018 | Ito et al. |

FOREIGN PATENT DOCUMENTS

| | | | |
|---|---|---|---|
| CN | 109904424 A | * | 6/2019 |
| JP | 11-191416 A | | 7/1999 |
| JP | 2008-535173 A | | 8/2008 |
| JP | 2013-149433 A | | 8/2013 |
| JP | 2017-033817 A | | 2/2017 |
| JP | 2017-084521 A | | 5/2017 |
| JP | 2018-120705 A | | 8/2018 |
| JP | 2018-152256 A | | 9/2018 |
| WO | 2012/043566 A1 | | 4/2012 |
| WO | 2016/088292 A1 | | 6/2016 |

OTHER PUBLICATIONS

Machine translation of JP 2017-084521 A (Year: 2017).*
International Search Report dated Dec. 15, 2020, issued in counterpart International application No. PCT/JP2020/036800, with English translation. (5 pages).
Tang Manjing et al: "Overall structural modification of a layered Ni-rich cathode for enhanced cycling stability and rate capability at high voltage", Journal of Materials Chemistry A, vol. 7, No. 11, Mar. 12, 2019 (Mar. 12, 2019), pp. 6080-6089, XP055965350; Cited in Extended European Search Report dated Nov. 3, 2022. (10 pages).
The Extended European Search Report dated Nov. 3, 2022, issued in counterpart EP Application No. 20872573.9. (7 pages).
Office Action dated Jan. 15, 2024, issued in counterpart CN Application No. 202080068004.7, with partial English translation. (10 pages).
Office Action dated Jul. 23, 2024, issued in counterpart CN Application No. 202080068004.7, with partial English translation. (7 pages).

* cited by examiner

Primary Examiner — Robert S Carrico
(74) Attorney, Agent, or Firm — WHDA, LLP

(57) ABSTRACT

This positive electrode active material for nonaqueous electrolyte secondary batteries includes a lithium transition metal complex oxide that has a spinel structure and that is represented by general formula $Li_{1+\alpha}Ni_{0.5-x}Mn_{1.5-y-z}Ge_yM_{x+z}O_4$ (in the formula, $0 \leq \alpha < 0.2$, $0 \leq x < 0.2$, $0 < y < 0.45$, and $0 \leq z < 0.2$ are satisfied, and M represents at least one element selected from the group consisting of Mg, Al, Sc, Ti, Cr, V, Fe, and Co). In a secondary particle of the lithium transition metal complex oxide, the mole number ($Ge_{surf}$) of Ge at the surface portion when the total number of moles of metal elements other than Li is defined as 2 is larger than the mole number ($Ge_{bulk}$) of Ge at the center portion when the total number of moles of metal elements other than Li is defined as 2.

3 Claims, 1 Drawing Sheet

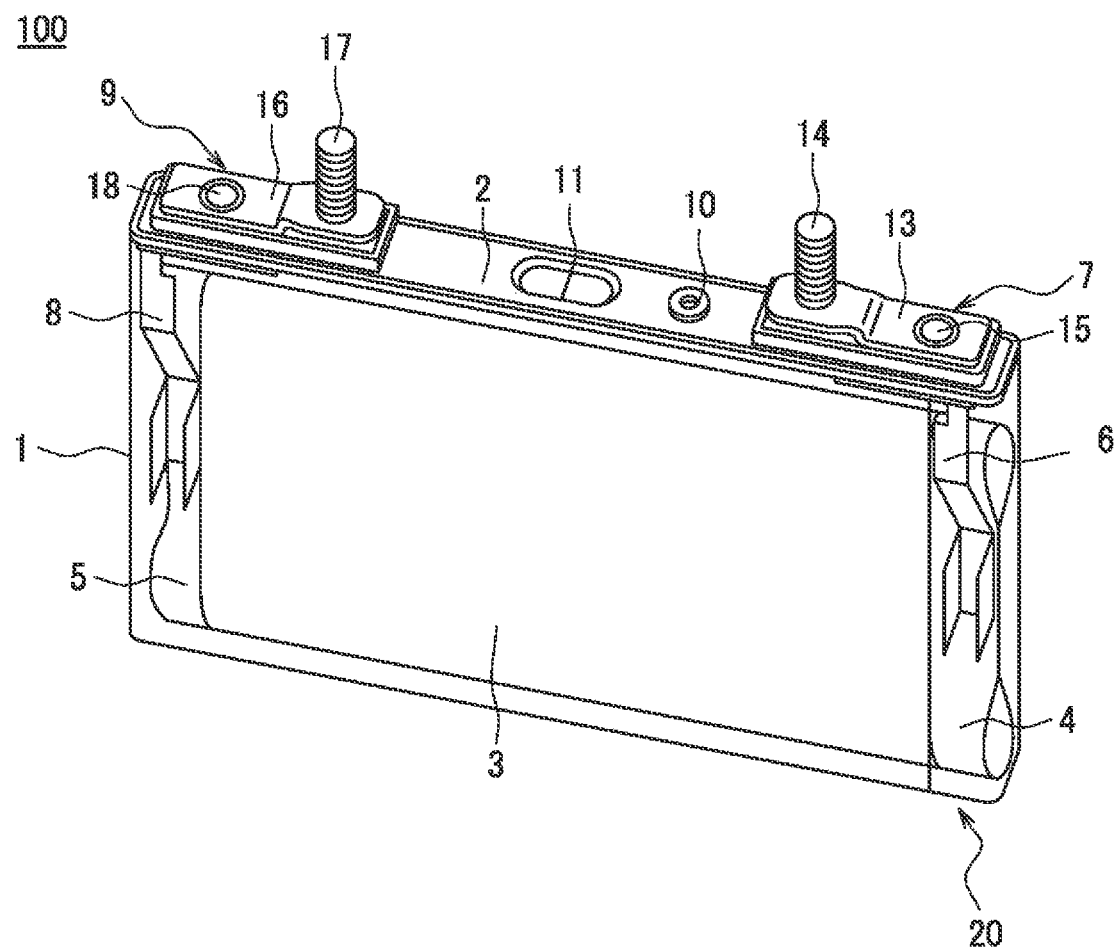

POSITIVE ELECTRODE ACTIVE MATERIAL FOR NONAQUEOUS ELECTROLYTE SECONDARY BATTERIES, AND NONAQUEOUS ELECTROLYTE SECONDARY BATTERY

CROSS-REFERENCE TO RELATED APPLICATIONS

This application is a national stage of International Application No. PCT/JP2020/036800, filed Sep. 29, 2020, which claims priority to Japanese Patent Application No. 2019-179786 filed Sep. 30, 2019 both of which are hereby incorporated by reference in their entirety.

TECHNICAL FIELD

The present disclosure generally relates to a positive electrode active material for a non-aqueous electrolyte secondary battery and to a non-aqueous electrolyte secondary battery using the positive electrode active material.

BACKGROUND ART

A lithium-transition metal composite oxide containing Li, Ni, and Mn, and having a spinel structure has attracted attention as a positive electrode active material because of being usable at high voltage and rich recoverable reserves of Mn. Patent Literature 1 discloses a F-containing positive electrode active material in which some Ni and Mn in a lithium-nickel-manganese oxide are substituted with another metal element to prevent deterioration of battery characteristics at high temperature. Patent Literature 2 discloses a positive electrode active material having a spinel structure and made of a bilayer-structured lithium-manganese oxide having different compositions on a surface and inside thereof to prevent deterioration of battery characteristics.

CITATION LIST

Patent Literature

PATENT LITERATURE 1: Japanese Unexamined Patent Application Publication No. 2017-33817
PATENT LITERATURE 2: National Publication of International Patent Application No. 2008-535173

SUMMARY

The positive electrode active material disclosed in Patent Literature 1 may lower a discharge capacity of the battery depending on the substituting metal element. The positive electrode active material disclosed in Patent Literature 2, which has an electrochemically inert coating layer on the surface, may lower a discharge capacity of the battery.

A positive electrode active material for a non-aqueous electrolyte secondary battery of an aspect of the present disclosure includes a lithium-transition metal composite oxide having a spinel structure and represented by the general formula $Li_{1+a}Ni_{0.5-x}Mn_{1.5-y-z}Ge_yM_{x+z}O_4$, wherein $0 \leq a < 0.2$, $0 \leq x < 0.2$, $0 < y < 0.45$, $0 \leq z < 0.2$, and M represents at least one or more elements selected from the group consisting of Mg, Al, Sc, Ti, Cr, V, Fe, and Co. In a secondary particle of the lithium-transition metal composite oxide, $Ge_{surf}$ is higher than $Ge_{bulk}$, where $Ge_{surf}$ represents the number of moles of Ge based on the total number of moles of metal elements excluding Li being 2 in a surface portion, and $Ge_{bulk}$ represents the number of moles of Ge based on the total number of moles of metal elements excluding Li being 2 in a central portion.

A non-aqueous electrolyte secondary battery of an aspect of the present disclosure comprises: a positive electrode including the positive electrode active material for a non-aqueous electrolyte secondary battery; a negative electrode; and a non-aqueous electrolyte.

According to an aspect of the present disclosure, a discharge capacity may be increased with a high voltage of the secondary battery.

BRIEF DESCRIPTION OF DRAWING

FIG. 1 is a perspective view of a secondary battery of an example of an embodiment, and illustrates an inside structure of a battery case with removing a front side of an exterior housing body.

DESCRIPTION OF EMBODIMENTS

Theoretically, a lithium-transition metal composite oxide containing Li, Ni, and Mn, and having a spinel structure may be charged and discharged at approximately 4.7 V; in reality, however, chargeable and dischargeable capacities at a voltage of 4.5 V or higher are limited because an oxygen deficiency is likely to occur during the synthesis of the lithium-transition metal composite oxide. As disclosed in Patent Literature 1, it is effective to add an additive element into the lithium-transition metal composite oxide to inhibit the occurrence of the oxygen deficiency during the synthesis. Unfortunately, such an additive element, which is typically electrochemically inert, may lower the practical capacity. The positive electrode active material disclosed in Patent Literature 2, which has the electrochemically inert coating layer on the surface, may lower the discharge capacity of the battery. Through the investigation, the present inventors have found that a positive electrode active material including a lithium-transition metal composite oxide containing Li, Ni, Mn, and Ge and having a spinel structure, and having a higher mole fraction of Ge on a surface than a mole fraction of Ge in a center may yield a secondary battery usable at a high voltage of 4.5 V or higher and having a high discharge capacity. This is assumed to be because incorporating more Ge on the surface may inhibit the occurrence of the oxygen deficiency and incorporating less Ge in the center may inhibit the lowering of the battery capacity.

Hereinafter, an example of an embodiment of the present disclosure will be described in detail. In the present embodiment, a secondary battery 100 comprising a rectangular metallic exterior housing body 1 will be exemplified, but a shape of the exterior housing body is not limited to be rectangular, and may be, for example, cylindrical or the like. A wound electrode assembly 3 will be exemplified, but may be a stacked electrode assembly in which a plurality of positive electrodes and a plurality of negative electrodes are alternately stacked one by one with separators interposed therebetween. In both of a positive electrode and a negative electrode, a case where each mixture layer is formed on both surfaces of each core body will be exemplified, but each mixture layer is not limited to the case where it is formed on both the surfaces of each core body as long as each mixture layer is formed on at least one surface of each core body.

As exemplified in FIG. 1, the secondary battery 100 comprises: the wound electrode assembly 3 in which the positive electrode and the negative electrode are wound with a separator interposed therebetween, which has a plain part and a pair of curved parts, and which is formed flatly; an electrolyte; and the exterior housing body 1 housing the electrode assembly 3 and the electrolyte. The exterior housing body 1 and a sealing plate 2 are both metallic, and preferably made of aluminum or an aluminum alloy.

The exterior housing body 1 has: a substantially rectangular bottom part viewed from a bottom face; and a side wall part provided in a standing manner on a peripheral edge of the bottom part. The side wall part is formed perpendicularly to the bottom part. A size of the exterior housing body 1 is not particularly limited, and for example, 60 to 160 mm in lateral length, 60 to 100 mm in height, and 10 to 40 mm in thickness.

The positive electrode is an elongated body having a metallic positive electrode core body and a positive electrode mixture layer formed on both surfaces of the core body, and formed is a band-shaped positive electrode core body exposed part 4 where the positive electrode core body is exposed along the longitudinal direction at one end part in the short direction. Similarly, the negative electrode is an elongated body having a metallic negative electrode core body and a negative electrode mixture layer formed on both surfaces of the core body, and formed is a band-shaped negative electrode core body exposed part 5 where the negative electrode core body is exposed along the longitudinal direction at one end part in the short direction. The electrode assembly 3 has a structure in that the positive electrode and the negative electrode are wound with the separator interposed therebetween in a state where the positive electrode core body exposed part 4 of the positive electrode is disposed on one end side in the axial direction and the negative electrode core body exposed part 5 of the negative electrode is disposed on the other side in the axial direction.

A positive electrode current collector 6 is connected to a stacked part of the positive electrode core body exposed part 4 of the positive electrode, and a negative electrode current collector 8 is connected to a stacked part of the negative electrode core body exposed part 5 of the negative electrode. A preferable positive electrode current collector 6 is made of aluminum or an aluminum alloy. A preferable negative electrode current collector 8 is made of copper or a copper alloy. A positive electrode terminal 7 has: a positive electrode external conductor 13 disposed on the sealing plate 2 outside the battery; a positive electrode bolt part 14 connected to the positive electrode external conductor 13; and a positive electrode insertion part 15 inserted through a through hole provided on the sealing plate 2. The positive electrode terminal 7 is electrically connected to the positive electrode current collector 6. A negative electrode terminal 9 has: a negative electrode external conductor 16 disposed on the sealing plate 2 outside the battery; a negative electrode bolt part 17 connected to the negative electrode external conductor 16; and a negative electrode insertion part 18 inserted through a through hole provided on the sealing plate 2. The negative electrode terminal 9 is electrically connected to the negative electrode current collector 8.

The positive electrode terminal 7 is fixed on the sealing plate 2 with an internal insulating member interposed therebetween, and the positive electrode current collector 6 is fixed on the sealing plate 2 with an external insulating member interposed therebetween. The internal insulating member is interposed between the sealing plate 2 and the positive electrode current collector 6, and the external insulating member is interposed between the sealing plate 2 and the positive electrode terminal 7. Similarly, the negative electrode terminal 9 is fixed on the sealing plate 2 with the internal insulating member interposed therebetween and the negative electrode current collector 8 is fixed on the sealing plate 2 with the external insulating member interposed therebetween. The internal insulating member is interposed between the sealing plate 2 and the negative electrode current collector 8, and the external insulating member is interposed between the sealing plate 2 and the negative electrode terminal 9.

The electrode assembly 3 is housed in the exterior housing body 1. The sealing plate 2 is connected to an edge of an opening of the exterior housing body 1 by laser welding or the like. The sealing plate 2 has an electrolyte injecting hole 10, which is to be sealed with a sealing plug after the electrolyte is injected into the exterior housing body 1. On the sealing plate 2, a gas discharging vent 11 is formed for discharging gas if an internal pressure of the battery increases to a predetermined value or more.

The electrolyte is a non-aqueous electrolyte including a non-aqueous solvent and an electrolyte salt dissolved in the non-aqueous solvent. For the non-aqueous solvent, for example, carbonates, lactones, ethers, ketones, esters, and the like may be used, and two or more of these solvents may be mixed to be used. When two or more of the solvents are mixed to be used, a mixed solvent including a cyclic carbonate and a chain carbonate is preferably used. For example, ethylene carbonate (EC), propylene carbonate (PC), butylene carbonate (BC), and the like may be used as the cyclic carbonate, and dimethyl carbonate (DMC), ethyl methyl carbonate (EMC), diethyl carbonate (DEC), and the like may be used as the chain carbonate. The non-aqueous solvent may contain a halogen-substituted solvent in which at least some hydrogens in the solvent are substituted with halogen atoms such as fluorine. For the electrolyte salt, $LiPF_6$, $LiBF_4$, $LiCF_3SO_3$, and the like, and a mixture thereof may be used. An amount of the electrolyte salt dissolved in the non-aqueous solvent may be, for example, 0.5 to 2.0 mol/L. Additives such as vinylene carbonate (VC) may also be appropriately added. The electrolyte is not limited to a liquid electrolyte, and may be a solid electrolyte using a gel polymer or the like.

Hereinafter, the positive electrode, negative electrode, and separator, which constitute the electrode assembly 3, particularly the positive electrode active material constituting the positive electrode, will be described in detail.

[Positive Electrode]

The positive electrode has a positive electrode core body and a positive electrode mixture layer provided on a surface of the positive electrode core body. For the positive electrode core body, a foil of a metal stable within a potential range of the positive electrode, such as aluminum, a film in which such a metal is disposed on a surface layer thereof, and the like may be used. The positive electrode mixture layer includes a positive electrode active material, a binder, and a conductive agent, and is preferably provided on both surfaces of the positive electrode core body except for the positive electrode core body exposed part 4. The positive electrode may be produced by, for example, applying a positive electrode mixture slurry including the positive electrode active material, the binder, the conductive agent, and the like on the surface of the positive electrode core body, drying and subsequently compressing the applied film to form the positive electrode mixture layers on both the surfaces of the positive electrode core body.

Examples of the conductive agent included in the positive electrode mixture layer may include a carbon material such as carbon black, acetylene black, Ketjenblack, and graphite. Examples of the binder included in the positive electrode mixture layer may include a fluororesin such as polytetrafluoroethylene (PTFE) and polyvinylidene fluoride (PVdF), polyacrylonitrile (PAN), a polyimide, an acrylic resin, and a polyolefin. With these resins, a cellulose derivative such as carboxymethyl cellulose (CMC) or a salt thereof, polyethylene oxide (PEO), and the like may be used in combination.

The positive electrode active material includes a lithium-transition metal composite oxide having a spinel structure and represented by the general formula $Li_{1+\alpha}Ni_{0.5-x}Mn_{1.5-y-z}Ge_yM_{x+z}O_4$ (in the formula, $0 \le \alpha < 0.2$, $0 \le x < 0.2$, $0 < y < 0.45$, $0 \le z < 0.2$, and M represents at least one or more elements selected from the group consisting of Mg, Al, Sc, Ti, Cr, V, Fe, and Co). In the lithium-transition metal composite oxide, Li, Ni, Mn, and Ge are essential components, and M is an optional component. Contents of Ni and Mn satisfying $0 \le x < 0.2$ and $0 < y < 0.45$ allow the lithium-transition metal composite oxide to be usable at high voltage. The spinel structure of the lithium-transition metal composite oxide may be confirmed by X-ray diffraction (XRD). Mole fractions of each element constituting the lithium-transition metal composite oxide are measured by inductively coupled plasma (ICP) atomic emission spectroscopic analysis. Hereinafter, for convenience of description, the lithium-transition metal composite oxide is referred to as "composite oxide (Z)". The positive electrode active material is mainly composed of the composite oxide (Z), and may be composed of substantially only the composite oxide (Z). The positive electrode active material may include a composite oxide other than the composite oxide (Z) or another compound within a range in that an object of the present disclosure is not impaired.

The composite oxide (Z) is, for example, a secondary particle formed by aggregation of primary particles. The particle diameter of the primary particles constituting the secondary particle is, for example, 0.05 μm to 1 μm. The particle diameter of the primary particles is measured as a diameter of a circumscribed circle in a particle image observed with a scanning electron microscope (SEM).

The composite oxide (Z) is particles having a median diameter (D50) on a volumetric basis of, for example, 3 μm to 30 μm, preferably 5 μm to 25 μm, and particularly preferably 7 μm to 15 μm. The D50, also referred to as a median diameter, means a particle diameter at which a cumulative frequency is 50% from a smaller particle diameter side in a particle size distribution on a volumetric basis. The particle size distribution of the composite oxide (Z) may be measured by using a laser diffraction-type particle size distribution measuring device (for example, MT3000II, manufactured by MicrotracBEL Corp.) with water as a dispersion medium.

In the composite oxide (Z), $Ge_{surf}$ is higher than $Ge_{bulk}$, where $Ge_{surf}$ represents the number of moles of Ge based on the total number of moles of metal elements excluding Li being 2 in a surface portion, and $Ge_{bulk}$ represents the number of moles of Ge based on the total number of moles of metal elements excluding Li being 2 in a central portion. This relation may increase the discharge capacity with high voltage of the secondary battery. Here, on a cross section of the composite oxide (Z), a thickness portion from the center to the ⅓ radius is referred to as the central portion, and a thickness portion from the surface to the ⅓ radius is referred to as the surface portion. The composite oxide (Z) may have a gradation structure in which a mole fraction of Ge based on the total number of moles of metal elements excluding Li increases from the surface to the inside. $Ge_{surf}$ and $Ge_{bulk}$ may be measured with an electron probe micro analyzer (EPMA).

A ratio of $Ge_{surf}$ to $Ge_{bulk}$ ($Ge_{surf}/Ge_{bulk}$) may satisfy a relation of $1.5 < Ge_{surf}/Ge_{bulk} < 5.0$. The $Ge_{surf}/Ge_{bulk}$ within this range may increase the discharge capacity more. A smaller $Ge_{surf}/Ge_{bulk}$ than this range is likely to cause the oxygen deficiency on the particle surface, and lowers the discharge capacity. A larger $Ge_{surf}/Ge_{bulk}$ than this range causes the surface to be electrochemically inert, and causes an increase in resistance or the like.

$Ge_{bulk}$ may satisfy $0.005 < Ge_{bulk} < 0.45$. $Ge_{bulk}$ within this range may increase the battery voltage more. A smaller $Ge_{bulk}$ than this range does not sufficiently provide the effect of increase in voltage. A larger $Ge_{bulk}$ than this range causes the surface to be electrochemically inert, and causes an increase in resistance or the like.

The composite oxide (Z) may be produced by, for example, the following procedure.

(1) A Li source such as lithium hydroxide (LiOH) is added into a composite compound (X) containing no Li, and the mixtures is calcined to synthesize a lithium composite oxide (Y). An example of the composite compound (X) is a composite oxide or hydroxide containing Ni and Mn.

(2) A Ge source such as $GeO_2$, $GeCl_4$, tetramethoxygermanium, tetraethoxygermanium, $LiNi_{0.5}Ge_{1.5}O_4$, $LiCo_{0.5}Ge_{1.5}O_4$, $LiZn_{0.5}Ge_{1.5}O_4$, $GeMnO_3$, $GeCoO_3$, $GeMn_2O_4$, $GeCo_2O_4$ is added into the lithium composite oxide (Y) to be mixed, and then the mixtures is calcined for forming a Ge solid solution with the lithium composite oxide (Y) to synthesize the composite oxide (Z). In this time, the Li source such as LiOH may be added in addition to the Ge source.

In the step (2), a calcining temperature is, for example, 700° C. to 1200° C., and a calcining time is, for example, 10 minutes to 10 hours. Regulating the calcining temperature and the calcining time may change a distribution state of the Ge solid solution in the composite oxide (Z), and thus, may regulate $Ge_{surf}$ and $Ge_{bulk}$. With a lower calcining temperature and a shorter calcining time, Ge remains near the surface and not enter the inside, resulting in increased value of $Ge_{surf}/Ge_{bulk}$.

[Negative Electrode]

The negative electrode has a negative electrode core body and a negative electrode mixture layer provided on a surface of the negative electrode core body. For the negative electrode core body, a foil of a metal stable within a potential range of the negative electrode, such as copper, a film in which such a metal is disposed on a surface layer thereof, and the like may be used. The negative electrode mixture layer includes a negative electrode active material and a binder, and is preferably provided on both surfaces of the negative electrode core body except for the negative electrode core body exposed part 5. The negative electrode may be produced by, for example, applying a negative electrode mixture slurry including the negative electrode active material, the binder, and the like on the surface of the negative electrode core body, drying and subsequently compressing the applied film to form the negative electrode mixture layers on both the surfaces of the negative electrode core body.

The negative electrode mixture layer includes, for example, a carbon-based active material to reversibly occlude and release lithium ions, as the negative electrode active material. The carbon-based active material is preferably a graphite such as: a natural graphite such as flake graphite, massive graphite, and amorphous graphite; and an artificial graphite such as massive artificial graphite (MAG) and graphitized mesophase-carbon microbead (MCMB). For the negative electrode active material, a Si-based active material composed of at least one of Si and a Si-containing compound may also be used, and the carbon-based active material and the Si-based active material may be used in combination.

For the binder included in the negative electrode mixture layer, a fluororesin, PAN, a polyimide, an acrylic resin, a polyolefin, and the like may be used similar to that in the positive electrode, but styrene-butadiene rubber (SBR) is preferably used. The negative electrode mixture layer preferably further includes CMC or a salt thereof, polyacrylic acid (PAA) or a salt thereof, polyvinyl alcohol (PVA), and the like. Among them, SBR; and CMC or a salt thereof, or PAA or a salt thereof are preferably used in combination.

[Separator]

For the separator, a porous sheet having an ion permeation property and an insulation property is used. Specific examples of the porous sheet include a fine porous thin film, a woven fabric, and a nonwoven fabric. As a material for the separator, a polyolefin such as polyethylene and polypropylene, cellulose, and the like are preferable. The separator may have any of a single-layered structure and a multilayered structure. On a surface of the separator, a heat-resistant layer and the like may be formed.

EXAMPLES

Hereinafter, the present disclosure will be further described with Examples, but the present disclosure is not limited to these Examples.

Example 1

[Synthesis of Positive Electrode Active Material]

A nickel-manganese composite hydroxide having D50 of 12 μm with a composition of $Ni_{0.5}Mn_{1.5}(OH)_4$, obtained by coprecipitation, was calcined at 500° C. to obtain a nickel-manganese composite oxide (X).

Then, LiOH and the nickel-manganese composite oxide (X) were mixed so that a molar ratio between Li and the total amount of Ni and Mn was 1.02:1. This mixture was calcined at 700° C. for 8 hours in an oxygen atmosphere, and then crushed to obtain a lithium composite oxide (Y). XRD demonstrated that the lithium composite oxide (Y) had a spinel structure. ICP analysis demonstrated that the lithium composite oxide (Y) had a composition of $LiNi_{0.5}Mn_{1.5}O_4$.

Next, the lithium composite oxide (Y) and $GeO_2$ were dry-mixed so that a molar ratio between the total amount of Ni and Mn in the lithium composite oxide (Y) and Ge in $GeO_2$ was 2:0.136. This mixture was calcined in the atmosphere at 1000° C. for 30 minutes, and then crushed to obtain a positive electrode active material in which Ge formed a solid solution with the lithium composite oxide (Y). EPMA measurement demonstrated that a value of $Ge_{bulk}$ was 0.082 and a value of $Ge_{surf}/Ge_{bulk}$ was 2.1. ICP analysis demonstrated that the positive electrode active material had a composition of $LiNi_{0.5}Mn_{1.364}Ge_{0.136}O_4$. XRD demonstrated that the obtained positive electrode active material had a spinel structure.

[Production of Positive Electrode]

The above positive electrode active material, acetylene black, and polyvinylidene fluoride (PVdF) were mixed at a solid-content mass ratio of 96.3:2.5:1.2, an appropriate amount of N-methyl-2-pyrrolidone (NMP) was added, and then the mixture was kneaded to prepare a positive electrode mixture slurry. This positive electrode mixture slurry was applied on both surfaces of a positive electrode core body made of aluminum foil, the applied film was dried, and then rolled using a roller and cut to a predetermined electrode size to obtain a positive electrode in which the positive electrode mixture layer was formed on both the surfaces of the positive electrode core body. An exposed part where a surface of the positive electrode core body was exposed was provided at a part of the positive electrode.

[Production of Negative Electrode]

Natural graphite was used as the negative electrode active material. The negative electrode active material, carboxymethyl cellulose sodium salt (CMC-Na), and styrene-butadiene rubber (SBR) were mixed at a solid-content mass ratio of 100:1:1 in an aqueous solution to prepare a negative electrode mixture slurry. This negative electrode mixture slurry was applied on both surfaces of a negative electrode core body made of copper foil, the applied film was dried, and then rolled using a roller and cut to a predetermined electrode size to obtain a negative electrode in which the negative electrode mixture layer was formed on both the surfaces of the negative electrode core body. An exposed part where a surface of the negative electrode core body was exposed was provided at a part of the negative electrode.

[Preparation of Non-Aqueous Electrolyte]

Into a mixed solvent of fluoroethylene carbonate (FEC) and methyl 3,3,3-trifluoropropionate (FMP) at a volume ratio of 2:8, lithium hexafluorophosphate ($LiPF_6$) was dissolved at a concentration of 1.0 mol/litter. Vinylene carbonate (VC) was further dissolved into the above mixed solvent at a concentration of 2.0 mass % to prepare a non-aqueous electrolyte.

[Production of Battery]

An aluminum lead was attached to the exposed part of the positive electrode, a nickel lead was attached to the exposed part of the negative electrode, the positive electrode and the negative electrode were spirally wound with a separator made of polyolefin interposed therebetween, and then press-formed in the radial direction to produce a flat, wound electrode assembly. This electrode assembly was housed in an exterior housing body composed of an aluminum laminated sheet, the above non-aqueous electrolyte was injected thereinto, and then an opening of the exterior housing body was sealed to obtain a non-aqueous electrolyte secondary battery having a designed capacity of 650 mAh.

EXAMPLE 2

A non-aqueous electrolyte secondary battery was produced in the same manner as in Example 1 except that the lithium composite oxide (Y) and $GeO_2$ were dry-mixed so that a molar ratio between the total amount of Ni and Mn in the lithium composite oxide (Y) and Ge in $GeO_2$ was 2:0.015, this mixture was calcined in the atmosphere at 1000° C. for 30 minutes, and then crushed to obtain a positive electrode active material in which Ge formed a solid solution with the lithium composite oxide (Y). EPMA measurement demonstrated that a value of $Ge_{bulk}$ was 0.0076 and a value of $Ge_{surf}/Ge_{bulk}$ was 2.5. ICP analysis demonstrated that the positive electrode active material had a composition of $LiNi_{0.5}Mn_{1.485}Ge_{0.015}O_4$. XRD demonstrated that the obtained positive electrode active material had a spinel structure.

Comparative Example 1

A non-aqueous electrolyte secondary battery was produced in the same manner as in Example 1 except that the solid solution of GeO$_2$ was not formed and the lithium composite oxide (Y) itself was used as the positive electrode active material.

A discharge capacity and a voltage at SOC 50% were evaluated on each of the batteries of Examples and Comparative Example. The evaluation results are shown in Table 1. Table 1 also shows values of Ge$_{bulk}$ and Ge$_{surf}$/Ge$_{bulk}$.

[Measurement of Discharge Capacity]

The test cell was charged at a constant current of 0.2 C until a cell voltage reached 4.9 V under a temperature condition of 25° C., and then discharged at a constant current of 0.2 C until a cell voltage reached 3.0 V to determine a discharge capacity.

[Evaluation of Voltage at SOC 50%]

The test cell was charged at a constant current of 0.2 C to 50% of a design capacity of the battery under a temperature condition of 25° C. An initial voltage with a subsequent discharge at a constant current of 1 C was determined as a voltage at SOC 50%.

TABLE 1

| | Composition of positive electrode active material | Ge$_{bulk}$ | Ge$_{surf}$/Ge$_{bulk}$ | Discharge capacity (mAh) | Voltage at SOC 50% (V) |
|---|---|---|---|---|---|
| Example 1 | LiNi$_{0.5}$Mn$_{1.364}$Ge$_{0.136}$O$_4$ | 0.082 | 2.1 | 115 | 4.723 |
| Example 2 | LiNi$_{0.5}$Mn$_{1.485}$Ge$_{0.015}$O$_4$ | 0.0076 | 2.5 | 109 | 4.684 |
| Comparative Example 1 | LiNi$_{0.5}$Mn$_{1.5}$O$_4$ | 0 | — | 107 | 4.676 |

As shown in Table 1, any of the batteries of Examples had a higher discharge capacity and a higher voltage at SOC 50% than the battery of Comparative Example. Specifically, Example 1, in which Ge$_{bulk}$ was 0.082, had remarkably improved characteristics.

REFERENCE SIGNS LIST

1 Exterior housing body
2 Sealing plate
3 Electrode assembly
4 Positive electrode core body exposed part
5 Negative electrode core body exposed part
6 Positive electrode current collector
7 Positive electrode terminal
8 Negative electrode current collector
9 Negative electrode terminal
10 Electrolyte injecting hole
11 Gas discharging vent
13 Positive electrode external conductor
14 Positive electrode bolt part
15 Positive electrode insertion part
16 Negative electrode external conductor
17 Negative electrode bolt part
18 Negative electrode insertion part
100 Secondary battery

The invention claimed is:

1. A positive electrode active material for a non-aqueous electrolyte secondary battery, the positive electrode active material including a lithium-transition metal composite oxide having a spinel structure and represented by the general formula Li$_{1+\alpha}$Ni$_{0.5-x}$Mn$_{1.5-y-z}$Ge$_y$M$_{x+z}$O$_4$, wherein 0≤α<0.2, 0≤x<0.2, 0<y<0.45, 0≤z<0.2, and M represents at least one or more elements selected from the group consisting of Mg, Al, Sc, Ti, Cr, V, Fe, and Co, wherein
when, on a cross section of a secondary particle of the lithium-transition metal composite oxide, a thickness portion from a center to a ⅓ radius is defined as a central portion, and a thickness portion from a surface to the ⅓ radius is defined to as a surface portion, in the secondary particle of the lithium-transition metal composite oxide, Ge$_{surf}$ is higher than Ge$_{bulk}$, where Ge$_{surf}$ represents a number of moles of Ge based on a total number of moles of metal elements excluding Li being 2 in the surface portion, and Ge$_{bulk}$ represents a number of moles of Ge based on a total number of moles of metal elements excluding Li being 2 in the central portion, and
a ratio of the Ge$_{surf}$ to the Ge$_{bulk}$ (Ge$_{surf}$/Ge$_{bulk}$) satisfies a relation of 1.5<Ge$_{surf}$/Ge$_{bulk}$<5.0.

2. The positive electrode active material for a non-aqueous electrolyte secondary battery according to claim 1, wherein the Ge$_{bulk}$ satisfies 0.005<Ge$_{bulk}$<0.45.

3. A non-aqueous electrolyte secondary battery, comprising:
a positive electrode including the positive electrode active material for a non-aqueous electrolyte secondary battery according to claim 1;
a negative electrode; and
an electrolyte.

\* \* \* \* \*